May 25, 1965
J. F. BELL
3,184,961
OPTICAL STRAIN GAUGE
Original Filed June 25, 1959
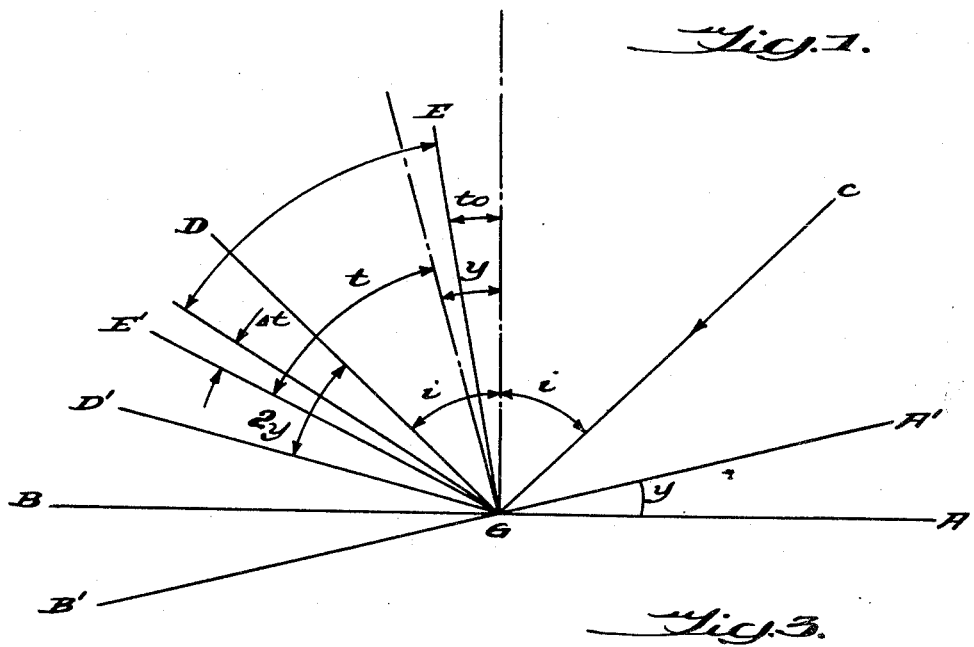
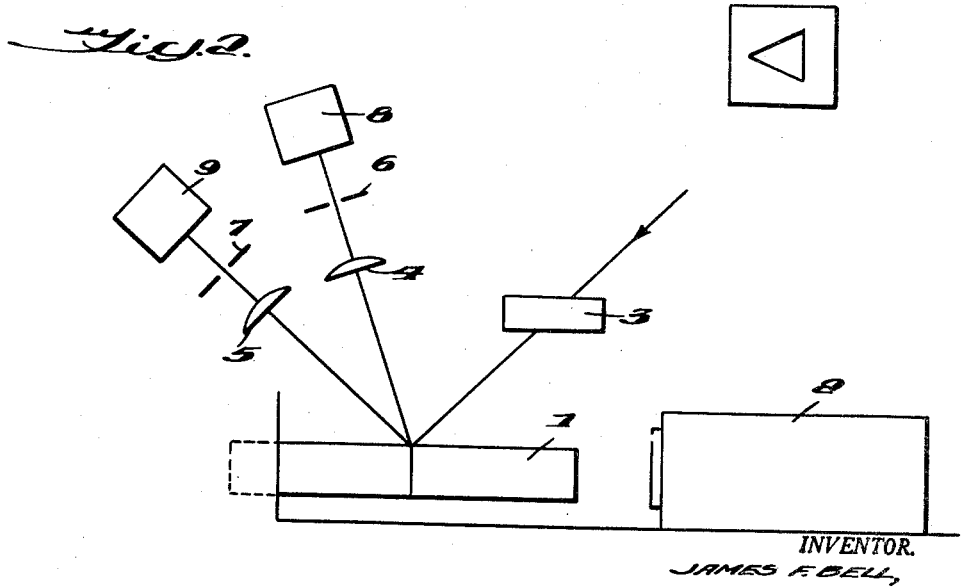
INVENTOR.
JAMES F. BELL,

3,184,961
OPTICAL STRAIN GAUGE

James F. Bell, Baltimore, Md., assignor to Marvalaud Incorporated, Westminster, Md., a corporation of Maryland
Continuation of abandoned application Ser. No. 823,277, June 25, 1959, which is a division of application Ser. No. 645,050, Mar. 11, 1957, now Patent No. 2,929,242. This application Mar. 23, 1962, Ser. No. 181,940
8 Claims. (Cl. 73—88)

This application is a continuation of application Serial 823,277, filed June 25, 1959, now abandoned, which was a division of application Serial No. 645,050 filed March 11, 1957, now Patent No. 2,929,242.

This invention relates to an apparatus for determining strain in solids. More specifically, the invention relates to an apparatus for determining the strain, slope of surface and linear displacement of a member through the measurement of movement of the diffracted and central images from a difffraction grating.

The use of strain gauges is quite well known. One of the most common types of gauges is a resistant wire gauge in which a resistance wire is embedded in a material glued to the surface of the structural member. Variations in strain in the structural elements produce corresponding variations in the resistance of the wire and thus means is provided for determining the degree of strain. The disadvantages in such gauges are well recognized. With these gauges it is necessary to provide a gauge of sufficient length so that measurable resistance changes are obtained and furthermore the top limit of strain of the structural member is determined by the strength of the glue used to secure the strain gauge to the structural member. The present invention is designed to overcome many of these disadvantages and yet provide a gauge which will determine strain with a higher degree of accuracy than has been possible heretofore.

The present invention contemplates the provision of a diffraction grating on the member undergoing tests. A source of light is provided adjacent this diffraction grating and light is reflected and diffracted from the grating through a V-shaped slit in a plate disposed between the diffraction gating and a photo-multiplier tube. The photo-multiplier and an associated electrical circuit will measure and record the intensity of one order of the light diffracted and reflected from the grating. The intensity of the light which is diffracted and reflected as measured through the V-shaped slit is a measurement of the angles of diffraction and reflection. The structural element is then loaded and a second measurement of the reflected and diffracted images is made. Strain in the specimen will cause a change in the number of lines per inch in the grating an hence will cause a corresponding change in the angle of diffraction. The angle of reflection will not, of course, be affected by a variation in the number of lines in the grating but loading of the structural member will produce an angular variation in the surface of the member and thus the change in the angle of reflection is a measurement of this angular variation in the specimen surface. It is also possible according to the presently described method to measure longitudinal displacement of the structural member.

It is possible with the presently described method and apparatus to make either dynamic or static determinations of plastic strains in solids. A gauge length of a few thousandths of an inch have been used to measure strains up to eight percent total load.

An object of the present invention is to provide a gauge which will measure strain, slope of surface and linear displacement in a structural member with a high degree of accuracy.

Another object of the present invention is to provide a strain gauge, a portion of which constitutes a permanent part of the structural member to be tested and to which the remaining portion of the gauge may be applied to determine strain at any time.

Still another object of the present invention is to provide the apparatus for determining strain in which the variation in the angle of diffraction from a diffraction grating is measured.

Other objects and many of the attendant advantages of the present invention will become apparent upon consideration of the following detailed description taken in connection with the accompanying drawing wherein:

FIG. 1 is a diagram showing the basic concept of the present invention,

FIG. 2 is a block diagram of the apparatus utilized in carrying out the method, and FIG. 3 is an elevational view of one of the V-shaped slits.

Referring now to FIG. 1 of the drawing, line A–B represents the specimen surface initially. The incident light is represented by the line CG, the point G denoting the location of the grating on the specimen surface. The line GD represents the reflected image and it is obvious that the angles $i$ are equal. The diffracted image is represented by the line GE. Under load the specimen surface will be distorted angularly to position $A'B'$ through an angle $y$. The reflected image will be moved through an angle $2y$ to a position represented by line $D'G$. The diffracted image will be shifted to a position represented by $E'G$ and this line is at an angle $t$ to the line normal to the plane of the surface. If the angle $t_0$ represents the initial angle of diffraction and $\Delta t$ is the change in the diffraction angle produced by the strain, it can be seen that the total angular motion of the diffracted image is $t+y-t_0-\Delta t$.

The diffraction grating is located in a uniform light field, and a cylindrical lens is used to focus the diffracted image on a V-shaped slit so that the displacement $d$ along the V slit is produced by the angular motion is $$d = f(t+y-t_0-\Delta t)$$

where $f$ is the focal length of the cylindrical lens.

The light intensity upon the photo-multiplier tube is directly proportional to the length of the image upon the V-shaped slit interposed between the diffraction grating and the photo-multiplier tube. After a displacement $d$, we have $i_d/I_d = d/b$ where $i_d$ is the change in intensity from the displacement $d$ and $I_d$ is the total intensity at the initial position and $b$ is the distance from the end of the slit to the initial position.

Thus, it is seen that for the diffracted image the equation $t+y-t_0-\Delta t = -(b/f)(i_d/I_d)$ applies.

As is seen in FIG. 1, the change in the angle of the central image is twice that of the angle $y$ since the direction of the incident light is fixed. For the central image, $2y = -(b/f)(i_c/I_c)$ where $i_c$ is the change in intensity from the motion of the reflected image on a V-shaped slit while $I_c$ represents the initial total intensity of the central image before stress. Both V slits are located so that increasing angles give a decreasing intensity. Due to this arrangement it is necessary to insert a minus (−) sign in the above equations showing the relationship between angular displacement and intensity. $I_d$ and $I_c$ are determined by using rectangular slits.

Where $n$ is the spectral order, $x$ the wave length of light and $m$ the number of lines per inch in the grating, strain $e$ is indicated by $e = \cos t.\Delta t/nxm$ and $$e = (\cos t/nxm)[t-t_0+(b/f)(i_d/I_d-I_c/2I_c)]$$

From the foregoing, it is apparent that the strain may be determined by measurements of the diffraction angles both before and after strain. The angular displacement of the surface is readily determined from the change in the angle of reflection. By removing the cylindrical lens before one of the photo-multiplier tubes and using two light sources on the specimen, displacement also may be determined.

In FIG. 2 there is shown an apparatus which may be utilized in the determination of strain. At 1 there is shown a specimen which is subjected to impact by weight 2. The source of light is shown at 3 and the diffracted and reflected images pass through lenses 4 and 5 respectively, V-shaped slits 6 and 7 and the light intensity is measured by photo-multiplier tubes 8 and 9.

The light beam is focused on the diffraction grating and is reflected and diffracted through the lenses 5 and 4 respectively. The line of light reflected is at a given position on the V slit 7 which will constitute a light of a certain intensity, producing a response in the photo-multiplier. This response can be determined by any convenient means such as, for example, an oscilloscope. Similarly, the diffracted image will constitute a line of light the intensity of which on the V silt 6 will be measured by photo-multiplier 8. The specimen is then put under strain by mass 2 which is arranged on a track so that it may be given a predetermined velocity toward the end of the specimen. The strain in the specimen will produce a variation in the number of lines per inch in the diffraction grating and this will move the line of light in the V slit 6 and the variation in the intensity measured by the photo-multiplier is an indication of the degree of movement. The reflected image will be moved only by angular variations in the surface of the specimen and as brought out hereinbefore the angle through which the reflected image moves is twice the angle through which the surface moves.

It is within the purview of this invention to provide a punch or the like having a grating on the face thereof whereby a diffraction grating can be readily imprinted on any structural members. An optical system mounted in a portable unit could be provided so that strain measurements could be made after the structure is assembled. Measurements could be made at various times during the life of the structure so that the exact strain will always be known.

It is apparent that the drawing and description given herein constitute one embodiment of the inventive concept. Any order of diffracted or reflected images may be measured and, for example, the incident light may be focused normally to the specimen surface and the angles of diffraction on both sides of the incident light path measured.

Obviously, many modifications and variations of the present invention may be made in the light of the above teachings. What is claimed as new and desired to be secured by Letters Patents is:

I claim:
1. A device for measuring strain of a structural element comprising, in combination, a diffraction grating on the structural element, a light source to direct light to said diffraction grating, a pair of means positioned to receive light reflected and diffracted from the diffraction grating and separate means for each of said receiver means to vary the response of said receiver means as the angles of the light from said diffraction grating vary.

2. An optical strain gauge for measuring the strain in a structural element comprising, a diffraction grating on the structural element, a light source to direct light to said diffraction grating, photoelectric receiver means and means defining a pair of V-shaped slits positioned to receive a pair of independent beams of light reflected and diffracted from the diffraction grating to vary the response of said photoelectric receiver means independently as the angles of the beams of light from the diffraction grating are varied.

3. An optical strain gauge comprising a diffraction grating on a structural element, a light source focusing a beam of light on said diffraction grating, means defining a pair of V-shaped slits positioned to receive a pair of independent light beams from said diffraction grating, photoelectric means for receiving light through said V-shaped slits whereby variation in the angle of the light beams from the diffraction grating varies the signal produced by the photoelectric means.

4. An optical strain gauge comprising, in combination, a diffraction grating on a structural element, a light source focusing a beam of light on said diffraction grating, means defining a pair of V-shaped slits, one of said slits being positioned to receive light reflected from said diffraction grating, the other of said slits being positioned to receive light diffracted from said diffraction grating and photoelectric means for independently measuring the angles of diffraction and reflection.

5. An optical strain gauge for measuring the strain in a structural element comprising a diffraction grating on the structural element, means to apply a force to said structural element to effect a change in the number of lines per unit length of said grating, a light source to direct light to said diffraction grating, photoelectric receiver means, and shaped slit defining means associated with said receiver mean to vary the response of said receiver means as the angles of the light reflected and diffracted from said diffraction grating vary.

6. An optical strain gauge comprising a diffraction grating on a structural element, light source means to focus a light beam on the diffraction grating, a first lens to focus light reflected from said diffraction grating on means defining a first V-shaped slit, first photoelectric receiver means to receive light passing through said first V-shaped slit, a second lens to focus light diffracted from said grating on means defining a second V-shaped slit, and second photoelectric receiver means to receive light passing through said second V-shaped slit.

7. An optical strain gauge for measuring the strain in a structural element comprising a diffraction grating on the structural element, a light source to direct to said diffraction grating, photoelectric receiver means, and means defining a slit associated with said receiver means to vary the response of said receiver means as the angle of light diffracted from said diffraction grating varies.

8. An optical strain gauge as claimed in claim 7 wherein said slit has a width which varies along its length.

References Cited by the Examiner
UNITED STATES PATENTS
2,937,561   5/60   Saunderson et al. _____ 88—14

RICHARD C. QUEISSER, Primary Examiner.

JOSEPH P. STRIZAK, Examiner.